(12) United States Patent
Chapman et al.

(10) Patent No.: US 9,821,230 B2
(45) Date of Patent: *Nov. 21, 2017

(54) DATA-DRIVEN STATE MACHINE FOR USER INTERACTIVE DISPLAYS

(71) Applicant: Zynga Inc., San Francisco, CA (US)

(72) Inventors: Peter Chapman, Frisco, TX (US); Andrew Foster, Irving, TX (US); Michael Capps, Dallas, TX (US)

(73) Assignee: Zynga Inc., San Francisco, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/091,932

(22) Filed: Apr. 6, 2016

(65) Prior Publication Data

US 2016/0239184 A1   Aug. 18, 2016

Related U.S. Application Data

(63) Continuation of application No. 13/460,123, filed on Apr. 30, 2012, now abandoned.

(Continued)

(51) Int. Cl.
*A63F 13/60* (2014.01)
*A63F 13/69* (2014.01)
(Continued)

(52) U.S. Cl.
CPC .............. *A63F 13/60* (2014.09); *A63F 13/69* (2014.09); *G06F 3/04842* (2013.01);
(Continued)

(58) Field of Classification Search
CPC .......... G06F 11/3644; A63F 2300/5526; A63F 2300/5533; A63F 13/49; A63F 13/60; A63F 13/69
See application file for complete search history.

(56) References Cited

U.S. PATENT DOCUMENTS 6,031,549 A   2/2000   Hayes-Roth
6,160,986 A   12/2000  Gabai et al.
(Continued)

OTHER PUBLICATIONS

"U.S. Appl. No. 13/460,123, Examiner Interview Summary mailed Jan. 13, 2016", 2 pgs.
(Continued)

*Primary Examiner* — William H McCulloch, Jr.
(74) *Attorney, Agent, or Firm* — Schwegman Lundberg & Woessner, P.A.

(57) ABSTRACT

Systems and methods may be used to provide and implement a state machine in a display software user interface environment, and used to handle events and actions associated with the state machine. In one example embodiment, a virtual display environment provided by an engine is interfaced with a state machine that is configured to interpret various state machine definitions corresponding to states occurring in the virtual display environment. The state machine definitions may be used to determine how a particular state of a virtual item in the display environment may be represented, interacted with, and transitioned into another state. Use of the state machine definitions may enable representation of complex scenarios for virtual objects and events in the display environment in a unified definition format, without requiring specialized programming or scripting commands to implement the scenarios.

21 Claims, 9 Drawing Sheets

Related U.S. Application Data

(60) Provisional application No. 61/557,258, filed on Nov. 8, 2011.

(51) Int. Cl.
*A63F 13/49* (2014.01)
*G06F 3/0484* (2013.01)
G06F 3/0481 (2013.01)
G06Q 50/00 (2012.01)
G06F 11/36 (2006.01)

(52) U.S. Cl.
CPC ....... *A63F 13/49* (2014.09); *A63F 2300/5526* (2013.01); *A63F 2300/5533* (2013.01); *G06F 3/04817* (2013.01); *G06F 11/3644* (2013.01); *G06Q 50/01* (2013.01)

(56) References Cited

U.S. PATENT DOCUMENTS

| | | |
|---|---|---|
| 6,425,825 B1 | 7/2002 | Sitrick |
| 7,478,047 B2 | 1/2009 | Loyall et al. |
| 7,493,305 B2 | 2/2009 | Thusoo et al. |
| 7,778,948 B2 | 8/2010 | Johnson et al. |
| 7,867,086 B2 | 1/2011 | Sitrick |
| 8,032,618 B2 | 10/2011 | Criddle et al. |
| 8,074,199 B2 | 12/2011 | Millett et al. |
| 8,137,201 B2 | 3/2012 | Chickering et al. |
| 8,167,712 B2 | 5/2012 | Sarkar et al. |
| 8,237,743 B2 | 8/2012 | Csurka et al. |
| 8,317,611 B2 | 11/2012 | Sitrick |
| 8,660,849 B2 | 2/2014 | Gruber et al. |
| 8,683,429 B2 | 3/2014 | Mueller |
| 8,753,204 B2 | 6/2014 | Manton et al. |
| 8,758,130 B2 | 6/2014 | Sitrick |
| 8,764,560 B2 | 7/2014 | Sitrick |
| 8,769,122 B2 | 7/2014 | Hutcheson et al. |
| 8,795,091 B2 | 8/2014 | Sitrick |
| 8,821,276 B2 | 9/2014 | Sitrick |
| 8,876,611 B2 | 11/2014 | Yuan |
| 8,905,843 B2 | 12/2014 | Sitrick |
| 9,364,744 B2 | 6/2016 | Auterio et al. |
| 9,463,386 B1 * | 10/2016 | Chapman ............. A63F 13/60 |
| 2001/0044339 A1 | 11/2001 | Cordero et al. |
| 2003/0122858 A1 | 7/2003 | Mauve |
| 2004/0249885 A1 | 12/2004 | Petropoulakis et al. |
| 2005/0091637 A1 | 4/2005 | Schechter et al. |
| 2006/0247053 A1 | 11/2006 | Mattila |
| 2007/0094325 A1 | 4/2007 | Ih et al. |
| 2007/0207852 A1 | 9/2007 | Nelson et al. |
| 2007/0293292 A1 | 12/2007 | Gipp et al. |
| 2008/0018049 A1 | 1/2008 | Hebden |
| 2008/0039206 A1 | 2/2008 | Ackley et al. |
| 2008/0045335 A1 | 2/2008 | Garbow et al. |
| 2008/0068389 A1 | 3/2008 | Bakalash et al. |
| 2008/0070659 A1 | 3/2008 | Naicker |
| 2008/0085766 A1 | 4/2008 | Sitrick |
| 2009/0042646 A1 | 2/2009 | Sarkar et al. |
| 2009/0143126 A1 | 6/2009 | O'kane et al. |
| 2009/0149243 A1 | 6/2009 | Naicker et al. |
| 2010/0138775 A1 | 6/2010 | Kohen et al. |
| 2010/0178985 A1 | 7/2010 | Chickering et al. |
| 2010/0227675 A1 | 9/2010 | Luxton et al. |
| 2010/0312865 A1 | 12/2010 | Criddle et al. |
| 2011/0105229 A1 | 5/2011 | Sitrick |
| 2011/0130184 A1 | 6/2011 | Mills |
| 2011/0312423 A1 | 12/2011 | Mosites et al. |
| 2012/0094758 A1 | 4/2012 | Sitrick |
| 2012/0172120 A1 | 7/2012 | Sitrick |
| 2012/0196677 A1 | 8/2012 | Sitrick |
| 2012/0252572 A1 | 10/2012 | Ackley et al. |
| 2012/0257820 A1 | 10/2012 | Sanghvi et al. |
| 2012/0289303 A1 | 11/2012 | Jagannatha et al. |
| 2013/0053151 A1 | 2/2013 | Sohn et al. |
| 2013/0101976 A1 | 4/2013 | Roots et al. |
| 2013/0116046 A1 | 5/2013 | Manton et al. |
| 2013/0311969 A1 | 11/2013 | Mueller |
| 2014/0031129 A1 | 1/2014 | Morrison et al. |
| 2014/0031130 A1 | 1/2014 | Janakiraman et al. |
| 2014/0073427 A1 | 3/2014 | Sitrick |
| 2014/0221092 A1 | 8/2014 | Manton et al. |
| 2016/0101357 A1 | 4/2016 | Miller et al. |
| 2016/0101362 A1 | 4/2016 | Mccaffrey et al. |
| 2016/0144279 A1 | 5/2016 | Manton et al. |

OTHER PUBLICATIONS

"U.S. Appl. No. 13/460,123, Examiner Interview Summary dated Sep. 9, 2015", 6 pgs.

"U.S. Appl. No. 13/460,123, Final Office Action dated Jan. 13, 2016", 16 pgs.

"U.S. Appl. No. 13/460,123, Non Final Office Action dated Dec. 12, 2014", 15 pgs.

"U.S. Appl. No. 13/460,123, Response filed Mar. 12, 2015 to Non-Final Office Action dated Dec. 12, 2014", 20 pgs.

"U.S. Appl. No. 13/460,123, Response filed Sep. 15, 2014 to Restriction Requirement mailed Jul. 15, 2014", 10 pgs.

"U.S. Appl. No. 13/460,123, Restriction Requirement dated Jul. 15, 2014", 6 pgs.

"U.S. Appl. No. 13/460,181, Examiner Interview Summary dated Sep. 9, 2015", 6 pgs.

"U.S. Appl. No. 13/460,181, Final Office Action dated Mar. 24, 2016", 16 pgs.

"U.S. Appl. No. 13/460,181, Non Final Office Action dated Jan. 13, 2015", 18 pgs.

"U.S. Appl. No. 13/460,181, Response filed Mar. 12, 2015 to Non-Final Office Action dated Jan. 13, 2015", 19 pgs.

"U.S. Appl. No. 13/460,181, Response filed Sep. 26, 2014 to Restriction Requirement mailed Aug. 8, 2014", 12 pgs.

"U.S. Appl. No. 13/460,181, Restriction Requirement dated Aug. 8, 2014", 6 pgs.

"Data-driven animation states", [Online]. Retrieved from the Internet: <URL: http://gamedev.stackexchange.com/questions/27079/data-driven-animation-states>, (Accessed Jul. 12, 2012), 3 pgs.

"Search for Al Architecture on AlWisdom.com", [Online]. Retrieved from the Internet: <URL: http://www.aiwisdom.com/ai_architecture.html>, (Accessed Jul. 12, 2012), 8 pgs.

Bayliss, Jessica D, et al., "Games as a "Flavor" of CS1", ACM SIGCSE Bulletin, vol. 38, No. 1, (Mar. 2006), 500-504.

Brovvnlee, Jason, "Finite State Machines (FSM)", [Online]. Retrieved from the Internet: <URL: http://ai-depot.com/FiniteStateMachines/FSM-Background.html>, (Accessed Jul. 12, 2012), 6 pgs.

Champandard, Alex J, "Common Way to Implement Finite State Machines in Games", [Online]. Retrieved from the Internet: <URL: http://aigamedev.com/open/article/fsm-implementation>, (Nov. 16, 2007), 4 pgs.

Dragert, Christopher, et al., "Toward High-Level Reuse of Statechart-based Al in Computer Games", GAS '11, Proceeding of the 1st International Workshop on Games and Software Engineering, (2011), 25-28.

GBGames, "State of the Art Game Objects", [Online]. Retrieved from the Internet: <URL: http://gbgames.com/blog/2010/10/state-of-the-art-game-objects/>, (Oct. 27, 2010), 10 pgs.

Gill, Sunbir, "Visual Finite State Machine Al Systems", [Online]. Retrieved from the Internet: <URL: http://www.gamasutra.com/view/feature/2165/visual_finite_state_machine_ai.php>, (Nov. 18, 2004), 5 pgs.

Glenday, Craig, "Guiness World Records 2009", Bantam Books. Title, Copyright, p. 241, [Online] retrieved from the internet: < https://books.google.com/books?id=aHYt0RNSDfgC&Ipg=PA269&dq=9780553592566&pg=PA241#v=onepage&q&f=false>, (May 2009), 241.

Krajewski, John, "Creating All Humans: A Data-Driven AI Framework for Open Game Worlds", [Online]. Retrieved from the Internet: <URL: http://www.gamasutra.com/view/feature/1862/creating_all_humans_a_datadriven_.php>, (Feb. 4, 2009), 3 pgs.

(56) References Cited

OTHER PUBLICATIONS

Raim, Jarret, et al., "Finite State Machines in Games", Powerpoint Presentation, (2004), 27 pgs.

Stewart, Kevin, "XML Finite State Machine in C#", [Online]. Retrieved from the Internet: <URL: http://www.codeproject.com/Articles/2063/XML-Finite-State-Machine-in-C>, (Mar. 31, 2002), 3 pgs.

Verdia, Jamie B, "State Machines by Example: A Useful FSM", [Online]. Retrieved from the Internet: <URL: http://magicscrollsofcode.blogspot.com/2012/02/state-machines-by-example-useful-fsm.html>, (Feb. 13, 2012), 10 pgs.

Wagner, Ferdinand, et al., "Modeling Software with Finite State Machines: A Practical Approach", Auerbach Publications, ISBN: 978-0849380860 (Chapters 4-10), (May 16, 2006), 63-202.

"U.S. Appl. No. 13/460,181, Amendment Under 37 C.F.R. § 1.312 filed Aug. 30, 2016", 12 pgs.

"U.S. Appl. No. 13/460,181, Notice of Allowance dated Aug. 18, 2016", 12 pgs.

"U.S. Appl. No. 13/460,181, Preliminary Amendment filed Aug. 17, 2012", 10 pgs.

"U.S. Appl. No. 13/460,181, Response filed Jun. 23, 2016 to Final Office Action dated Mar. 24, 2016", 17 pgs.

\* cited by examiner

DATA-DRIVEN STATE MACHINE FOR USER INTERACTIVE DISPLAYS

PRIORITY CLAIM

This application is a continuation of U.S. patent application Ser. No. 13/460,123, filed on Apr. 30, 2012, which claims priority under 35 U.S.C. §119(e) to U.S. Provisional Patent Application Ser. No. 61/557,258, filed Nov. 8, 2011; both of these applications are incorporated by reference herein in their entireties.

TECHNICAL FIELD

This disclosure generally relates to data-driven state machines used in generating user interactive displays and like software settings.

DESCRIPTION OF EXAMPLE EMBODIMENTS

Figure 1:
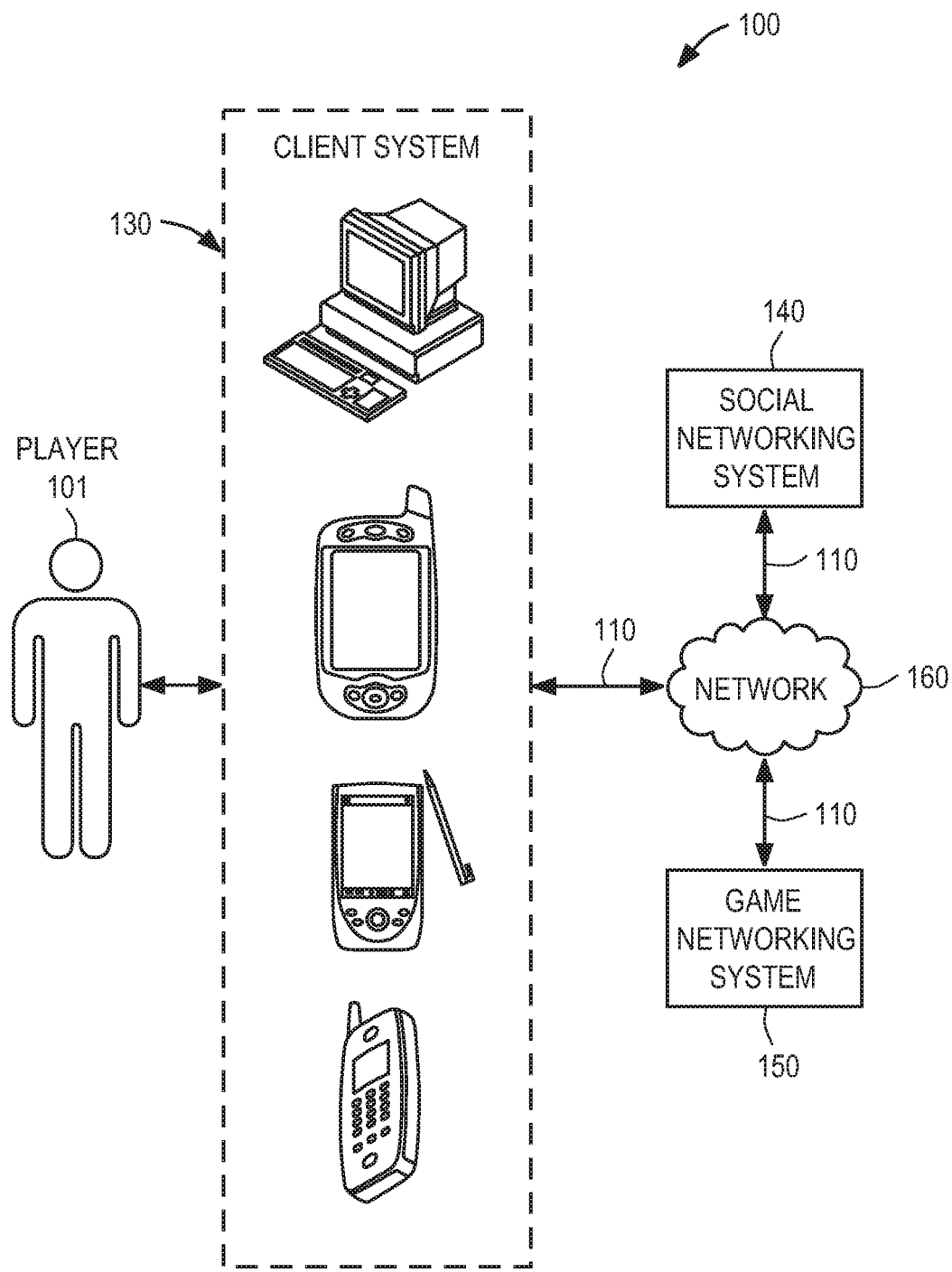
FIG. 1 illustrates an example of a system for implementing particular disclosed embodiments.

Various techniques and configurations relevant to data driven state machines are disclosed herein. Data driven state machines may be used in a variety of software settings, but are particularly useful in the design and implementation of software-implemented games that present a plurality of game-related states, events, and actions that change as a result of user interaction. For example, data driven state machines may be implemented in role playing games to navigate through the various states and actions resulting from the sequential events of game play, without requiring special programming for each action or use case.

In an example embodiment described herein, a state machine (also known as a finite state machine (FSM) or finite-state automaton) may be used to control an in-game object, such as a behavior or appearance of an object included as a portion of a multi-player online game. The various interactive items that are provided to a player within a particular game may be described and implemented in terms of state machine states. Each state may be defined to specify the visual appearance of the item, and in what interactions it can participate. In the example of an interactive game with a "farming" component, for example, a crop goes from a "planted" state, through various "growing" states, and finally waits in a "ripe" state for a period of time before continuing to a "withered" state. While in the "ripe" state, the crop can be harvested and while in the "withered" state the crop can be cleared. Various user interactions with the crop may further affect the state in which the crop remains.

This process of defining, interpreting, and implementing relevant states and actions can be applied for any number of virtual objects presented in a game or other software application. Use of an event or data-driven state machine to implement actions and events in the game or other software application may further provide a simplified technique to develop complex rule-based scenarios, without requiring specialized programming code to handle each action or event. Additionally, providing a state machine architecture allows designers to define the various objects in a standardized format with minimal need for programmer support. Accompanied by a definition scheme for the state machine, use of the definitions may result in reduced development times and implementation complexity.

As will be apparent, the particular game or software environment that implements the presently disclosed state machine may vary significantly based on user requirements, game types, software environments, and like factors. The following describes example gaming and social network environments in which the presently described embodiments may be implemented, followed by implementation details of example systems and methods for establishing and utilizing a data driven state machine and state machine definitions.

Example Gaming Environment

In many online computer games, there is a virtual world or some other imagined playing space where a player of the game controls one or more player characters (herein "characters," "player characters," or "PCs"). Player characters can be considered in-game representations of the controlling player. As used herein, the terms player, user, entity, and friend may refer to the in-game player character controlled by that player, user, entity, or friend, unless context suggests otherwise. A game display can display a representation of the player character. A game engine accepts inputs from the player, determines player character actions, decides outcomes of events, and presents the player with a game display illuminating game play. In some games, there are multiple players, wherein each player controls one or more player characters.

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

FIG. 1 illustrates an example of a system for implementing various disclosed embodiments. In some example embodiments, system 100 includes player 101, social networking system 140, game networking system 150, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 140 is a network-addressable computing system that can host one or more social graphs. Social networking system 140 can generate, store, receive, and transmit social networking data. Social networking system 140 can be accessed by the other components of system 100 either directly or via network 160. Game networking system 150 is a network-addressable computing system that can host one or more online games. Game networking system 150 can generate, store, receive, and transmit game-related data, such as, for example, game account data, game input, game state data, and game displays. Game networking system 150 can be accessed by the other components of system 100 either directly or via network 160. Player 101 may use client system 130 to access, send data to, and receive data from social networking system 140 and game networking system 150. Client system 130 can access social networking system 140 or game networking system 150 directly, via network 160, or via a third-party system. As an example and not by way of limitation, client system 130 may access game networking system 150 via social networking system 140. Client system 130 can be any suitable computing device, such as a personal computer, laptop, cellular phone, smart phone, computing tablet, or the like.

Although FIG. 1 illustrates a particular number of players 101, social networking systems 140, game networking systems 150, client systems 130, and networks 160, this disclosure contemplates any suitable number of players 101, social networking systems 140, game networking systems 150, client systems 130, and networks 160. As an example and not by way of limitation, system 100 may include one or more game networking systems 150 and no social networking systems 140. As another example and not by way of limitation, system 100 may include a system that comprises both social networking system 140 and game networking system 150. Moreover, although FIG. 1 illustrates a particular arrangement of player 101, social networking system 140, game networking system 150, client system 130, and network 160, this disclosure contemplates any suitable arrangement of player 101, social networking system 140, game networking system 150, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi, Long Term Evolution (LTE), Long Term Evolution-Advanced (LTE-A), or Worldwide Interoperability for Microwave Access (WiMAX)) or optical (such as, for example, Synchronous Optical Network (SONET) or Synchronous Digital Hierarchy (SDH)) connections. In some example embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 140, game networking system 150, client system 130, and network 160, this disclosure contemplates any suitable connections between player 101, social networking system 140, game networking system 150, client system 130, and network 160. As an example and not by way of limitation, in some embodiments, client system 130 may have a direct connection to social networking system 140 or game networking system 150, bypassing network 160.

Online Games and Game Systems

In an online computer game, a game engine often manages the game state of the game. In the present disclosure, game states of at least some in-game objects may be managed by the game engine in co-operation with a data-driven state machine, as described in greater detail herein. Game state that may be managed and implemented by a game engine or a state machine may include game play parameters, including player character state, non-player character (NPC) state, in-game object state, game world state (e.g., internal game clocks, game environment), and other game play parameters. Each player 101 controls one or more player characters (PCs). The game engine or state machine may control all other aspects of the game, including non-player characters (NPCs), and in-game objects. The game engine or state machine may also manage game state, including player character state for currently active (online) and inactive (offline) players.

An online game can be hosted by game networking system 150, which can be accessed using any suitable connection with a suitable client system 130. A player may have a game account on game networking system 150, wherein the game account can contain or provide a variety of information associated with the player (e.g., the player's personal information, financial information, purchase history, player character state, game state). In some example embodiments, a player may play multiple games on game networking system 150, which may maintain a single game account for the player with respect to all the games, or multiple individual game accounts for each game with respect to the player. In some example embodiments, game networking system 150 can assign a unique identifier to each player 101 of an online game hosted on game networking system 150. Game networking system 150 can determine that a player 101 is accessing the online game by reading the user's cookies, which may be appended to Hypertext Transfer Protocol (HTTP) requests transmitted by client system 130, and/or by the player 101 logging onto the online game.

In some example embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 140, or game networking system 150). As an example and not by way of limitation, client system 130 can download client components of an online game, which are executed locally, while a remote game server, such as game networking system 150, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 150.

Game Play

In some example embodiments, player 101 can engage in, or cause a player character controlled by him to engage in, one or more in-game actions. For a particular game, various types of in-game actions may be available to player 101. As an example and not by way of limitation, a player character in an online role-playing game may be able to interact with other player characters, build a virtual house, attack enemies, go on a quest, perform certain assigned tasks, and go to a virtual store to buy/sell virtual items. As another example and not by way of limitation, a player character in an online poker game may be able to play at specific tables, place bets of virtual or legal currency for certain amounts, discard or hold certain cards, play or fold certain hands, and play in an online poker tournament.

In some example embodiments, player 101 may engage in an in-game action by providing one or more user inputs to client system 130. Various actions may require various types and numbers of user inputs. Some types of in-game actions may require a single user input. As an example and not by way of limitation, player 101 may be able to harvest a virtual crop by clicking on it once with a mouse. Some types of in-game actions may require multiple user inputs. As another example and not by way of limitation, player 101 may be able throw a virtual fireball at an in-game object by entering the following sequence on a keyboard: DOWN, DOWN and RIGHT, RIGHT, B. This disclosure contemplates engaging in in-game actions using any suitable number and type of user inputs.

In some example embodiments, player 101 can perform an in-game action on an in-game object. An in-game object is any interactive element of an online game. In-game objects may include, for example, PCs, NPCs, in-game assets and other virtual items, in-game obstacles, game elements, game features, and other in-game objects. This disclosure contemplates performing in-game actions on any suitable in-game objects. For a particular in-game object, various types of in-game actions may be available to player 101 based on the type of in-game object. As an example and not by way of limitation, if player 101 encounters a virtual bear, the game engine may give him the options of shooting the bear or petting the bear. Some in-game actions may be available for particular types of in-game objects but not other types. As an example and not by way of limitation, if player 101 encounters a virtual rock, the game engine may give him the option of moving the rock; however, unlike the virtual bear, the game engine may not allow player 101 to shoot or pet the virtual rock. Furthermore, for a particular in-game object, various types of in-game actions may be available to player 101 based on the game state of the in-game object. As an example and not by way of limitation, if player 101 encounters a virtual crop that was recently planted, the game engine may give him only the option of fertilizing the crop, but if player 101 returns to the virtual crop later when it is fully grown, the game engine may give him only the option of harvesting the crop.

In some example embodiments, the game engine may cause one or more game events to occur in the game. Game events may include, for example, a change in game state, an outcome of an engagement, a completion of an in-game obstacle, a transfer of an in-game asset or other virtual item, or a provision of access, rights and/or benefits. In some example embodiments, a game event is any change in game state. Similarly, any change in game state may be a game event. This disclosure contemplates any suitable type of game event. As an example and not by way of limitation, the game engine may cause a game event where the virtual world cycles between daytime and nighttime every 24 hours. As another example and not by way of limitation, the game engine may cause a game event where a new instance, level, or area of the game becomes available to player 101. As yet another example and not by way of limitation, the game engine may cause a game event where player 101's player character heals one hit point every five minutes.

In some example embodiments, a game event or change in game state may be an outcome of one or more in-game actions. The game engine can determine the outcome of a game event or a change in game state according to a variety of factors, such as, for example, game logic or rules, player character in-game actions, player character state, game state of one or more in-game objects, interactions of other player characters, or random calculations. As an example and not by way of limitation, player 101 may overcome an in-game obstacle and earn sufficient experience points to advance to the next level, thereby changing the game state of player 101's player character (it advances to the next character level). As another example and not by way of limitation, player 101 may defeat a particular boss NPC in a game instance, thereby causing a game event where the game instance is completed, and the player advances to a new game instance. As yet another example and not by way of limitation, player 101 may pick the lock on a virtual door to open it, thereby changing the game state of the door (it goes from closed to open) and causing a game event (the player can access a new area of the game).

In some example embodiments, player 101 may access particular game instances of an online game. A game instance is copy of a specific game play area that is created during runtime. In some example embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In some example embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In some example embodiments, an online game comprises only one game instance that all players 101 of the online game can access.

In some example embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. As used herein, a player who is thus uniquely associated with a specific game instance, and to whom certain actions are exclusively available, is referred to as a "host player."

Such a game instance associated with a specific player may be accessible by one or more other players, either synchronously or asynchronously with the specific player's game play. As an example and not by way of limitation, a first player (i.e., the host player) may be associated with a first game instance, but the first game instance may be accessed by all first-degree friends in the first player's social network. As used herein, players thus accessing a game instance associated with another player are referred to as "guest players." In some example embodiments, the game engine may create a specific game instance for a specific player when that player accesses the game. As an example and not by way of limitation, the game engine may create a first game instance when a first player initially accesses an online game, and that same game instance may be loaded each time the first player accesses the game.

In some example embodiments, the set of in-game actions available to a specific player may be different in a game instance that is associated with that player (e.g., in which the player is a host player) compared to a game instance that is not associated with that player (e.g., in which the player is a guest player). The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

Social Graphs and Social Networking Systems

In some example embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some example embodiments, a unique client identifier can be assigned to each user in the social graph. This disclosure assumes that at least one entity of a social graph is a player or player character in an online multiplayer game, though this disclosure may apply to any suitable social graph users.

The minimum number of edges to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend."

Within the social graph, each player (or player character) has a social network. A player's social network includes all users in the social graph within Nmax degrees of the player, where Nmax is the maximum degree of separation allowed by the system managing the social graph (such as, for example, social networking system 140 or game networking system 150). In one example embodiment, Nmax equals 1, such that the player's social network includes only first-degree friends. In another example embodiment, Nmax is unlimited and the player's social network is coextensive with the social graph.

In some example embodiments, the social graph is managed by game networking system 150, which is managed by the game operator. In other example embodiments, the social graph is part of a social networking system 140 managed by a third-party (e.g., Facebook, Friendster, Myspace, Google+). In yet other example embodiments, player 101 has a social network on both game networking system 150 and social networking system 140, wherein player 101 can have a social network on the game networking system 150 that is a subset, superset, or independent of the player's social network on social networking system 140. In such combined systems, game networking system 150 can maintain social graph information with edge type attributes that indicate whether a given friend is an "in-game friend," an "out-of-game friend," or both. The various example embodiments disclosed herein are operable when the social graph is managed by social networking system 140, game networking system 150, or both.

Figure 2:
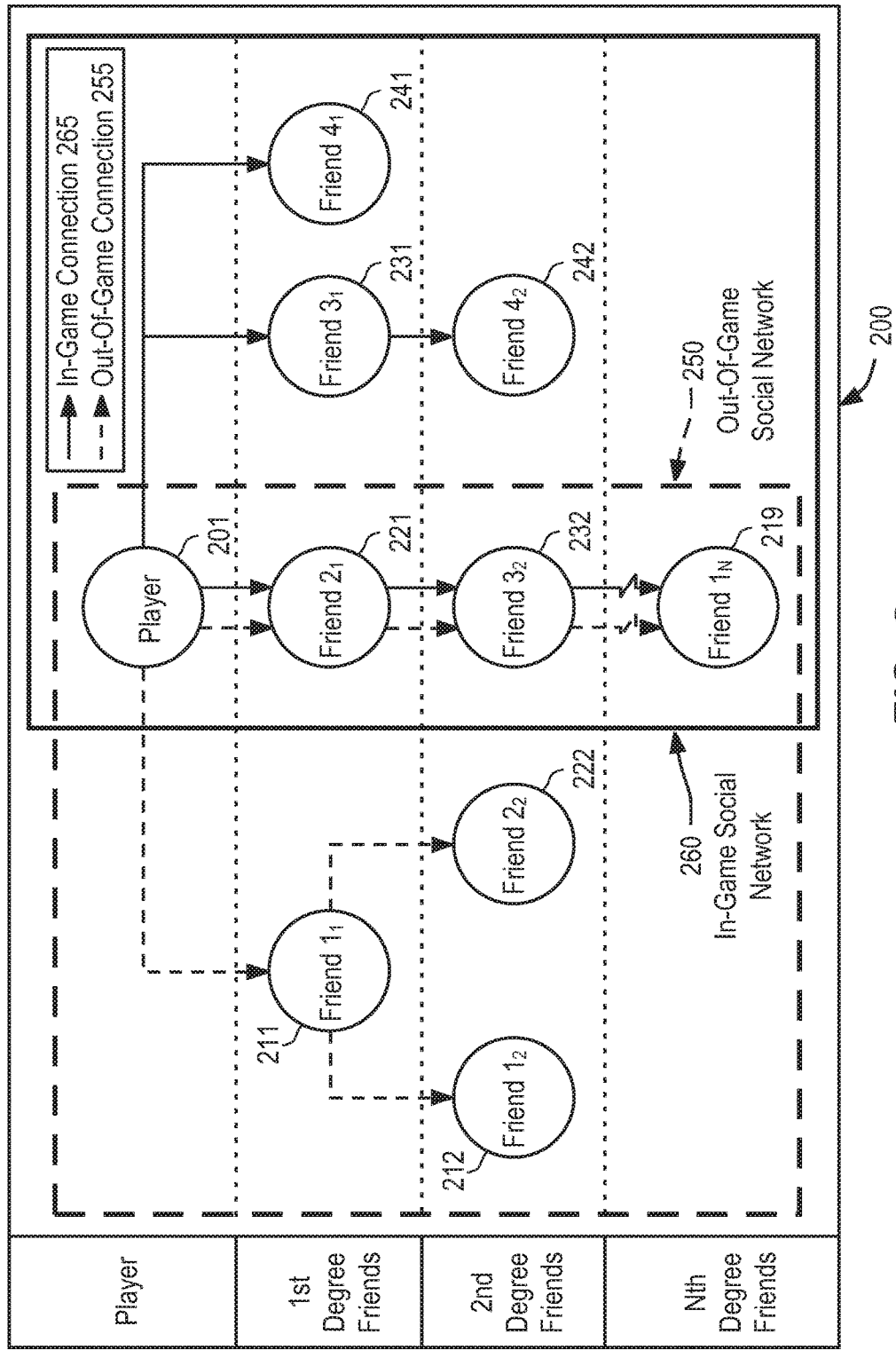
FIG. 2 illustrates an example social network.

FIG. 2 shows an example of a social network within a social graph 200. As shown, Player 201 can be associated, connected, or linked to various other users, or "friends," within the social network 250. These associations, connections, or links can track relationships between users within the out-of-game social network 250 and are commonly referred to as online "friends" or "friendships" between users. Each friend or friendship in a particular user's social network within a social graph is commonly referred to as a "node." For purposes of illustration and not by way of limitation, the details of out-of-game social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In out-of-game social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 140.

In various example embodiments, Player 201 can have Nth-degree friends connected to him through a chain of intermediary degree friends, as indicated in FIG. 2. For example, Nth-degree Friend $1_N$ 219 is connected to Player 201 via second-degree Friend $3_2$ 232 and one or more other higher-degree friends. Various example embodiments may take advantage of and utilize the distinction between the various degrees of friendship relative to Player 201.

In some example embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some example embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some example embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network 250, but a first-degree friend in Player 201's in-game social network 260. In some example embodiments, a game engine can access in-game social network 260, out-of-game social network 250, or both.

In some example embodiments, the connections in a player's in-game social network 260 can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

In multiplayer online games, two or more players can play in the same game instance. Game play is asynchronous when the players do not play simultaneously in the game instance. In some example embodiments, synchronous game play between two players in the same game instance can be simulated from asynchronous game play by recording the game play of a first player in the game instance at a first time and replaying that game play during the game play of a second player in the game instance at a later time. In some example embodiments, the game engine can record the in-game actions of a first player in a game instance for later play-back by other players in the game instance, and then the game engine loads and executes the previously recorded in-game actions during the game play of other players in the game instance.

Example System

Figure 3:
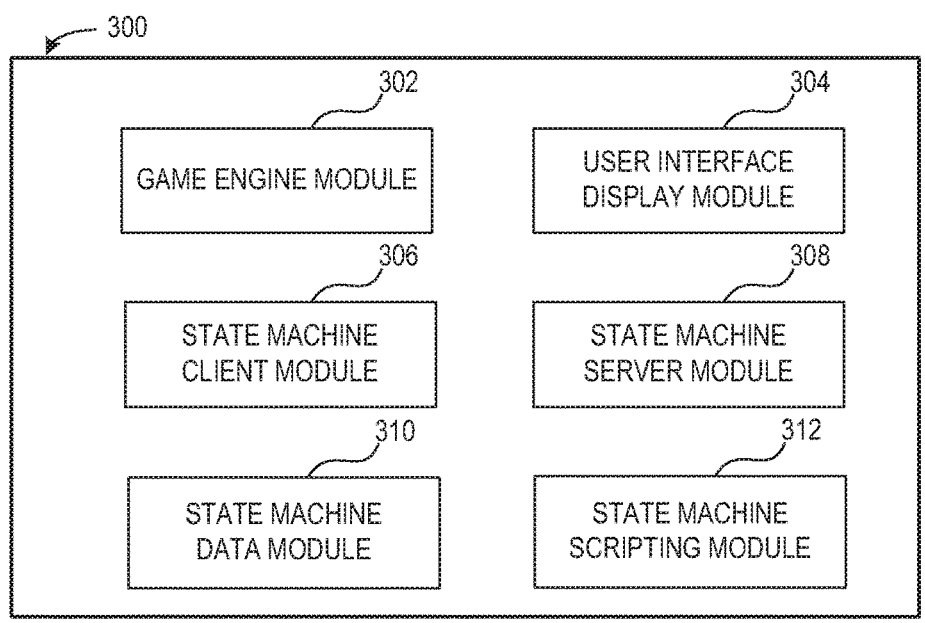
FIG. 3 illustrates an example system for implementing particular disclosed embodiments.

FIG. 3 illustrates an example system 300 for implementing some embodiments. The system 300 may comprise a number of hardware-implemented modules provided by one or more processors. The system 300 may include a game engine module 302 to manage a multiplayer online game. To this end, the game engine module 302 may include game logic to manage in-game object and non-player character behavior, and to execute in-game actions responsive to user input. The game engine module 302 may interact with a user interface display module 304 to generate a user interface to display the game and game-related graphics and text, and accept user commands and input in connection with particular game instances and the gaming environment.

A state machine client module 306 may be provided to interpret and perform state machine actions on a client interface, such as interacting with client-side scripting or other client-side capabilities on a user gaming interface, in connection with the game engine module 302. A state machine server module 308 may be provided to interpret and perform state machine actions on a server, such as interacting with server-side scripting or other server-side actions used to generate the game display for client users, in connection with the game engine module 302. Although state machine client module 306 and state machine server module 308 are illustrated as being included in a single system 300, it will be understood that in some embodiments client-side components and modules such as state machine client module 306 may be provided or otherwise operate in a first system that is separate from a second system providing server-side components and modules such as state machine server module 308.

A state machine data module 310 may be provided to read state machine definitions from a data source (for example, an XML file or a database) and provide the state machine definitions data to one or both of the state machine client module 306 and state machine server module 308. Alternatively, the state machine data module 310 may be implemented within functionality provided by either or both the state machine client module 306 and state machine server module 308. The state machine scripting module 312 may be configured to interpret scripting language commands provided within the state machine data definitions (such as provided in an XML definition read by the state machine data module 310), and interface with the state machine client module 306 and state machine server module 308 to perform actions on the client and server as necessary.

Functionality of the system 300 and its respective modules, in accordance with an example embodiment, is further described herein with respect to example methods.

Example Methods

Figure 4:
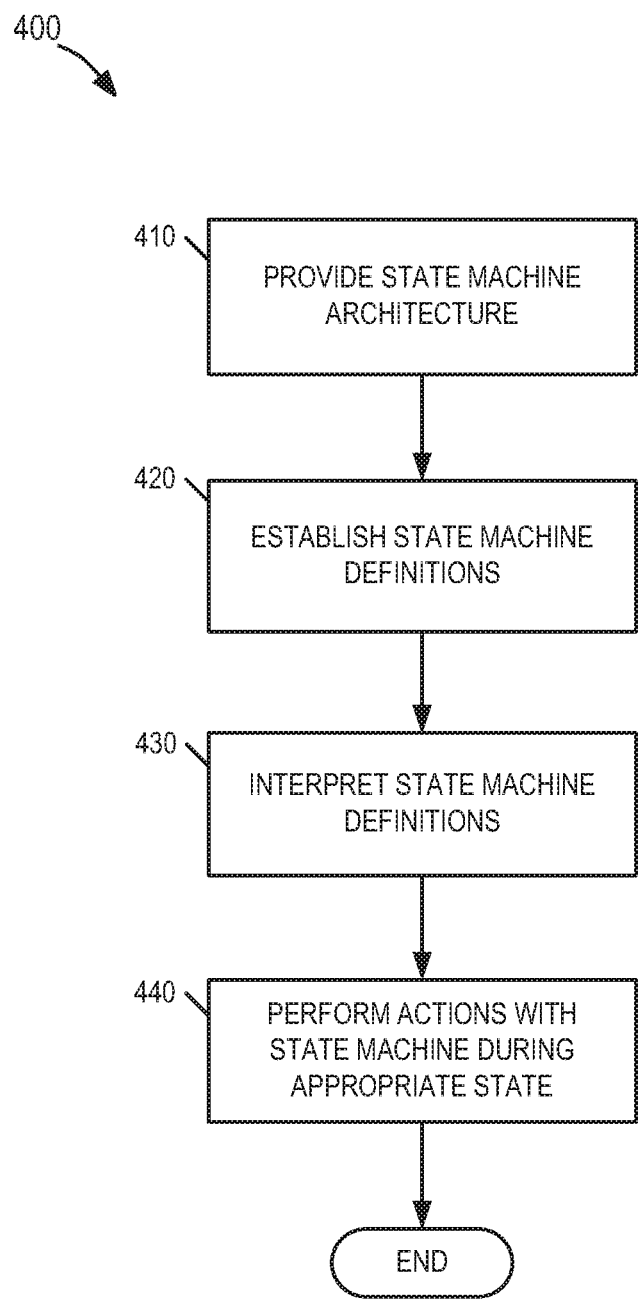
FIG. 4 illustrates an example flowchart of a method for implementing particular disclosed embodiments.

FIG. 4 illustrates a flowchart 400 of a high-level view of an example method to implement and use a data-driven state machine and state machine definitions within a user interface, for example, in a user interface provided in connection with an instance of a multiplayer online game. The example method 400 may be implemented by the system 300 (FIG. 3) or other suitably configured systems.

The method of flowchart 400 includes providing a state machine architecture at operation 410. This may include providing various executable state machine objects and modules configured to access and read state machine definitions, interpret the state machine definitions, and implement the state machine definitions in connection with an ongoing state for a software application such as a game. These objects and modules may include both client-side and server-side objects and modules for a server-hosted game.

The method of flowchart 400 further includes establishing state machine definitions at operation 420. This may include providing definitions in XML, another markup language, or a similar parsable definition format of data providing state information that may be parsed and interpreted by the state machine architecture components.

The method of flowchart 400 further includes interpreting the state machine definitions at operation 430. The interpretation of the state machine definitions may be performed by the various state machine architecture components deployed on client and server side operations. For example, in connection with server side operations, the interpretation of the appropriate state as identified in the state machine definitions may be performed directly or indirectly in conjunction with the operations of a server-operating game engine.

The method of flowchart 400 further includes performing actions with the state machine during the appropriate state at operation 440. For example, once state machine definitions are loaded and the appropriate state is determined in a state-dependent game, the state machine definitions may be employed to implement game-related actions, respond to user gaming interactions in various states, implement certain rules and responses for ongoing events, and generally perform state-appropriate actions as the game play progresses.

Example Data-Driven State Machine Architecture

In an example embodiment, a state machine is provided for execution of state machine actions in connection with both client and server operations (such as in connection with a client user interface accessing a server-hosted game engine). Each state intended to be parsed by the state machine is defined for each type of virtual in-game item as a textual string in a state machine definition, and provided to both the client and the server. Therefore, each action performed by the state machine may be implemented as a separate transaction that is sent from the client and processed on the server, as the client user interface is updated as appropriate. In some examples, all of the activities (items, states, actions, and transactions) must be provided by the state machine definition prior to its use by the state machine.

Figure 5:
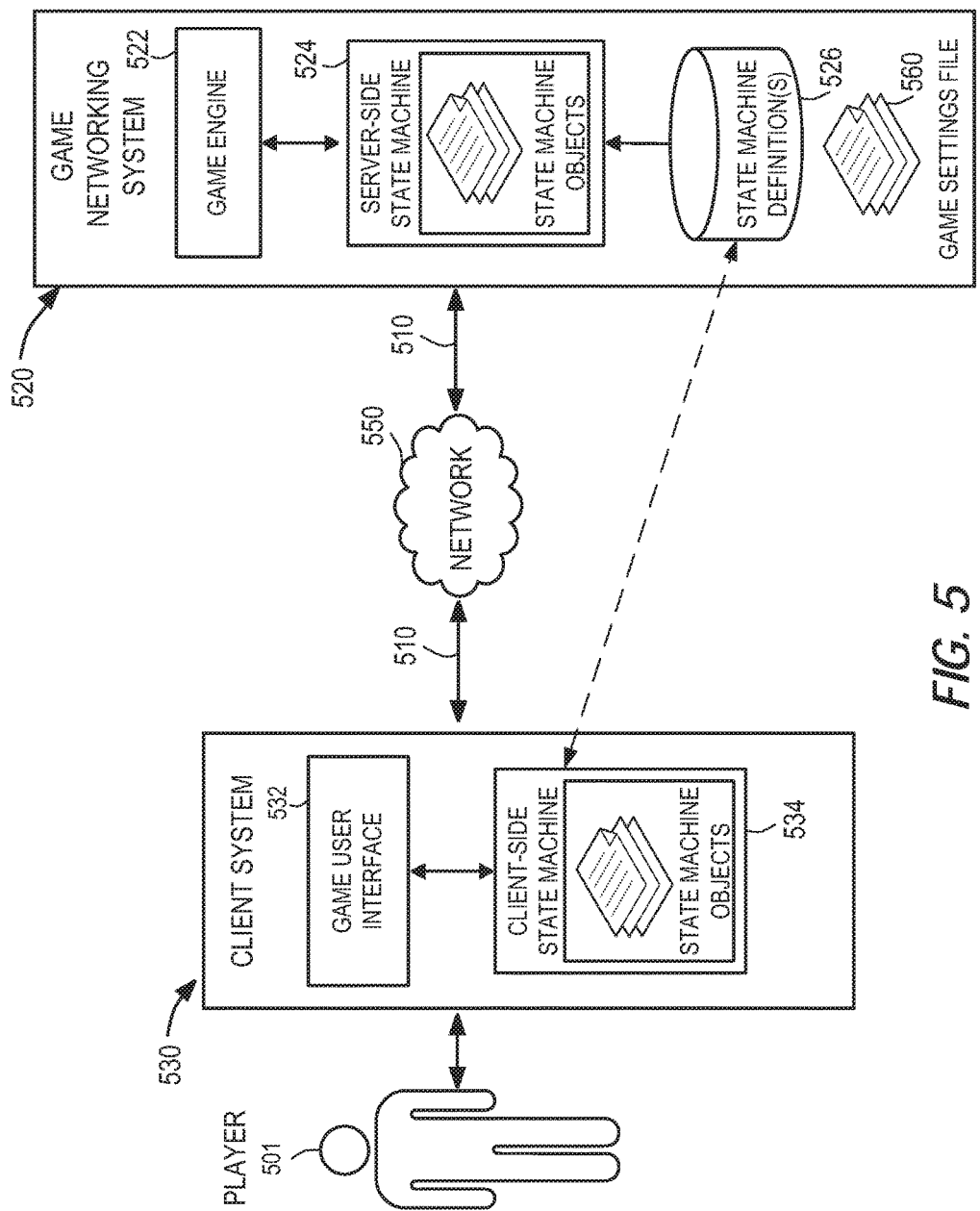
FIG. 5 illustrates an example layout of a data-driven state machine architecture used in connection with particular disclosed embodiments.

FIG. 5 provides an overview of a state machine architecture provided between a server and client according to one example embodiment, involving the connection between a client system 530 and a game networking system 520. As illustrated, a player 501 accesses a client system 530 that provides a game user interface 532 having one or more game displays (such as in connection with an ongoing role playing game). The client system 530 implements a client-side state machine 534 in communication with the game user interface 532. The client system 530 is used to implement display effects and interactions for game items and game play in the game user interface 532 as appropriate.

The example game networking system 520, which as illustrated is implemented as a server-hosted game, provides a game engine 522, server-side state machine 524, and a set of state machine definitions 526. The state machine definitions 526 are communicated or accessed by the server-side state machine 524, and are communicated directly or indirectly (such as via network 550 and network connections 510 in connection with one or more network connections to the game networking system 520) to client-side state machine 534. The state machine definitions are then parsed accordingly by the server-side state machine 524 and client-side state machine 534, which in turn affect operation of the game engine 522 and game user interface 532 respectively. For example, the game engine 522 may implement various actions and effects on virtual objects and the virtual game play as the game state changes, while the game user interface 532 may change the display or user interactivity available through the game user interface 532 as the game state changes.

In one example embodiment, state machine definitions 526 are specified in an XML file or in a similar data store of a parsable markup language format that is transmitted to the client system 530 along with other game-related data from the game networking system 520. The state machine definitions 526 may be combined with other game-parsable definitions used on either or both of the client system 530 and game networking system 520. For example, the state machine definitions 526 may be provided in a XML file that is also used to provide a number of other game settings such as game settings file 560. Such a configuration enables a single data-driven system that is implemented in the client and server code to interpret the definitions and produce the desired state functionality.

Providing the state machine definitions 526 as part of a game settings file (e.g., game settings file 560) also means that the state machine data only needs to be specified in one place, rather than in multiple classes on both the client and the server. Further, because all of the details for provision and management of in-game objects are in data as opposed to code, there is less code (both client and server) needed for each new behavior to be implemented in the game. A further benefit is that implementation and iteration of new gameplay can happen at a much faster pace.

Although the preceding state machine architecture was described with relation to a separate client-side state machine and server-side state machine, it will be apparent that similar operations may be conducted in connection with a single state machine, for example in instances of asynchronous game play where a game engine is located at the client system 530. Therefore, general references to a "state machine" as used herein may refer to either client-side state machine, server-side state machine, or a state machine operating independent of a client-server configuration.

State Machine Definitions

In an example embodiment, a series of textual definitions are established within an XML file to be parsed by the state machine. The textual definitions provide a functional operation of a state machine having a collection or set of states. The state machine therefore keeps track of which state is active, and provides an entry-point for all item interaction. The particular parameters and results of navigating through a plurality of states thus may be provided in connection with the data provided in the state machine definition.

Specifically, in one example embodiment, the state machine definition may include information relevant to a state, action, requirement, cost, and effect in connection with a scenario such as is provided in a player-interactive game. As used in the following examples, the relationship between a state, action, requirement, cost, and effect may be expressed as follows:

State: Each state specifies how an item (e.g., a virtual game object) is displayed to a user, which actions can be performed on it, and whether the state will transition to another state. A state may have a limited duration, after which it will automatically transition to another state (e.g., a crop virtual object that grows from one state to another after a certain period of time). States may also specify which visual representation the item should use, and provide additional information for any display associated with the state.

Action: An action is something being done or potentially being done to a virtual item (e.g., harvesting a crop). Each action may specify a list of interaction "modes" in which it can be performed. In practice, these modes generally correspond to interaction modes such as game modes, but they may be embodied as strings used to filter available actions. Actions can specify a duration and whether they require some specific user action (such as having a player-controlled avatar to be next to the item in order to conduct or enable the selection of the action). Each action may also have a list of pre-requisites necessary in order to take the action. The pre-requisites may include requirements and/or costs. Finally, an action may provide a list of effects.

Requirement: Requirements specify some property, a comparison operator, and a value (for example, that the player's experience level be less than three) for availability of an action. If the requirement is not met, the action is not available to be performed. In some examples the requirement may relate to an attribute or property of an in-game character controlled by the game player.

Cost: A cost is similar to a requirement except it is used to specify Player resources (for example, game resources such as coins, gems, energy, etc.), and the comparison is "greater than or equal to". Also, when the associated action is performed, the specified amount is deducted from the resource.

Effect: Effects indicate the results or consequences of associated events or actions. Each effect may be programmed to affect a specific thing, such as playing a sound or an animation, producing or changing some virtual object, or switching a state of some virtual item. In some examples, effects may change one or more properties of the virtual in-game character of the game player. For example, the effect of an action may increase an experience level or a score of the player. Thus, rather than writing logic to perform some result, an effect may be used to define what happens as a result of an action. With effects, a programmer can implement discrete portions of functionality that can then be composed into more complex actions by the designers.

The following XML example is used to demonstrate how a state machine definition may be implemented within a farming-type role playing game having a series of events for each of the farmed virtual goods. The following XML example, in particular, provides an example of a state machine definition for a crop, from a "seeds" state until a "withered" state.

```
<state_machine name="crop" initial_state="seeds">
  <states>
    <state name="seeds" duration="10:00" next="grow1" tooltip="
Fully Grown in [time_until(grown)]"/>
    <state name="grow1" duration="10:00" next="grow2" tooltip="
Fully Grown in [time_until(grown)]"/>
    <state name="grow2" duration="10:00" next="grown" tooltip="
Fully Grown in [time_until(grown)]"/>
```

-continued

```
    <state name="grown" duration="2:00:00" next="withered" tool
tip="Fully Grown: Click to Harvest">
      <actions>
        <action name="Harvest" duration="0:03"
progressText="Harvesting..." mode="GMDefault">
          <effects>
            <effect type="PlayAnimation" target="Avatar"
animation="chop" duration="0:03"/>
            <effect type="GenerateInventoryItemFromTable"
table="Crop_ItemTable"/>
            <effect type="ReplaceWithItemFromTable"
table="Crop_VarmintTable"/>
            <effect type="GenerateResource" resource="coins"
min="5" max="5"/>
            <effect type="GenerateResource" resource="experience"
min="10" max="10"/>
            <effect type="GenerateResource" resource="gems"
min="2" max="2"/>
          </effects>
          <costs>
            <cost resource="energy" amount="1"/>
          </costs>
        </action>
      </actions>
    </state>
    <state name="withered" tooltip="Withered: Click to Clear">
      <actions>
        <action name="Clear" duration="0:03"
progressText="Clearing..." mode="GMDefault">
          <effects>
            <effect type="GenerateResource" resource="coins"
min ="2" max="2"/>
            <effect type="ClearItem"/>
          </effects>
        </action>
      </actions>
    </state>
  </states>
</state_machine>
```

Although each of the state values may be provided directly within the state machine definition, various values may be substituted and placed within the state machine definition text as appropriate. For example, a scripting language may be used for run-time replacement of tokens within the state machine definition with game data as appropriate. This is evidenced in the XML above with the use of the scripting expression "[time_until(grown)]."

State Machine Execution

In an example embodiment, the state machine provides functionality to parse the state machine definitions and determine changes to the game engine and the game user interface in connection with virtual items. One or more state machine objects may be implemented to parse the state machine definitions, and programmatically interface with the game user interface 532 or the game engine 522. For example, each interactive virtual item on the client system 530 may correspond to a state machine object as a member, initialized from the received state machine definitions (e.g., received in XML format) by the client-side state machine 534.

When the Player 501 clicks or otherwise interacts with an item, the state machine engine (e.g., client-side state machine 534 or server-side state machine 524) may interface with the appropriate state machine object to determine which actions are available for the current game mode. Multiple actions may be presented as a result of an interaction. For example, if there is only one action in the current state with the correct mode, the action is executed, whereas if more than one action is available, a fly-out menu with each of the actions may be displayed allowing the Player 501 to choose an action to perform.

In a further example embodiment, the state machine objects provided for operation on a client system 530 or the server-side game networking system 520 may be configured to: load state machine definitions from an XML format source; parse the state machine definitions from the XML format source; and provide functionality to implement and perform individual states as provided in the state machine definition. The state machine object may be configured, for example, to load each state "node" as an object in code that describes how the object works. With this type of an object configuration, a state machine object may maintain its own state (such as what is the current state, when was the state entered, what actions may be performed from the state, and the like).

In this model, on the client, each item (or select items) in the game instance may have State Machine object as a member, initialized from the XML format source. When a player interacts with the interactive game, for example by clicking on an item, a determination is made using the State Machine object of which actions are available for the current game mode. If only one action is available, the action is executed; however, if there is more than one action available to a player, then a selection of actions may be offered (such as through a fly-out menu that appears in the game instance to allow the player to select the action to take).

Once an action is performed in the game instance, the costs and effects are processed and a single transaction ("TInteraction") may be sent to the server. The server receives the transaction and first determines the current state of the item. Once the state is determined, the action is checked for availability, and if the action is available, costs and effects are processed on the server. Additional processing may be performed based on game rules and action results. When this transaction cycle is completed, the item will be synchronized between both of the client and server.

When a state machine object is constructed, each state node from the XML definition is enumerated, and results in creation of a separate state object. Each object in turn has mapped actions, as the state machine object controls which actions are available. The state machine object may be executed by operating code on the client system 530 or server 520 using a command such as StateMachine.execute (action name). Upon such a command, the action requirements are evaluated; if requirements are met, the action performs the defined effects in the user interface (such as generating an animation, changing displayed objects, performing a visual or non-visual effect with certain virtual objects, and the like).

The use of a state machine may also provide benefits in a server/client architecture. For example, when executing an action on the client, each of the costs and effects are processed on the client, and a single transaction object is sent to the server. The transaction object contains an identifier of the object and the name of the action that was performed. Because the only information sent from the client is the name of the action, the server is authoritative over what effects will be performed.

The server, on receiving a transaction object, first determines the current state of the item. It does this by taking the item's last known state (for example, as maintained on the server by the server-side state machine 524) and the time the object has been in that state, and advancing through all states with a duration property. This way, time-based state changes on the client may not require a transaction to be sent to the server. Once the current state is determined, the action specified in the transaction is checked for availability (e.g., to verify that requirements and costs are met). If the action is available, the costs and effects are processed on the server. Some effects, such as playing sounds or animations, are client-side only. These are skipped when processing on the server 520. Once this transaction cycle is complete, the item will be in-sync with states on both the client and the server.

Applications of State Machines within Gaming Environments

Within a gaming environment and associated gaming user interface, the use of state machines and state machine definitions may provide interaction with a number of in-game display and interaction attributes. For example, state machine definitions may be used to affect one or more of the following aspects of in-game objects or items.

Visual State. For example, each state may provide a name property that is used to specify which image to use for the associated item. This behavior can be overridden, e.g., by specifying the property autoImage="false". In addition to the image, a state may specify a tooltip string and an indicator property that indicates whether or not to display an indicator. Data may also be used to display more complex tooltips as specified in a <complex_tooltip> child node of the state.

Proximity. For example, by default, all actions may require that the selected Avatar or player character in a game be within a certain distance of the item before the actions can be performed. This amounts to an implicit requirement that there be a selected Avatar. The pathing of the Avatar to the item and the subsequent processing of the action are all handled automatically. If an action does not require the Avatar, it can designate this by setting the property such as "requiresProximity="false"".

Action Progress. The state machine definition may also be used in connection with display of a progress bar or other status indicator for an action. For example, the text to be displayed on the progress bar (when an action has a duration) may be specified using a "progressText" property. By default, the progress bar will go from empty to full over the course of the action. This behavior can be modified by specifying "progressFrom" and "progressTo" properties. This can be used to make the progress bar go in reverse, or to only show partial progress along a multi-action process.

OnStart and OnFinish effects. While this feature is not necessarily visible to game play designers, it may be employed to provide various types of required functionality. Each effect may have two opportunities to do something when an action is being executed: as soon as an action is begun, and once an action is completed. The time between these two opportunities is the duration of the action. This is used, for instance, in a simulation game to start a chopping animation as soon as the Player clicks on a Tree object to remove it. The spawning of a reward such as "doobers" or "varmints", on the other hand, is done when the action completes. Whether an effect is processed on start or on complete (or both) is usually inherent in the effect itself and not specified in the XML, but some effects may provide attributes to explicitly control this functionality.

Counters. Each state machine may have a <counters> node which specifies a list of named counters and their starting values. There is an effect, <Counter>, which allows designers to increment, decrement, or set a counter. There are also effects that allow them to test a counter and conditionally execute other effects. Using Counters, a designer may be able to implement many complex state machines with fewer states.

Implementation of State Machine Definitions and Interpretations

Figure 6:
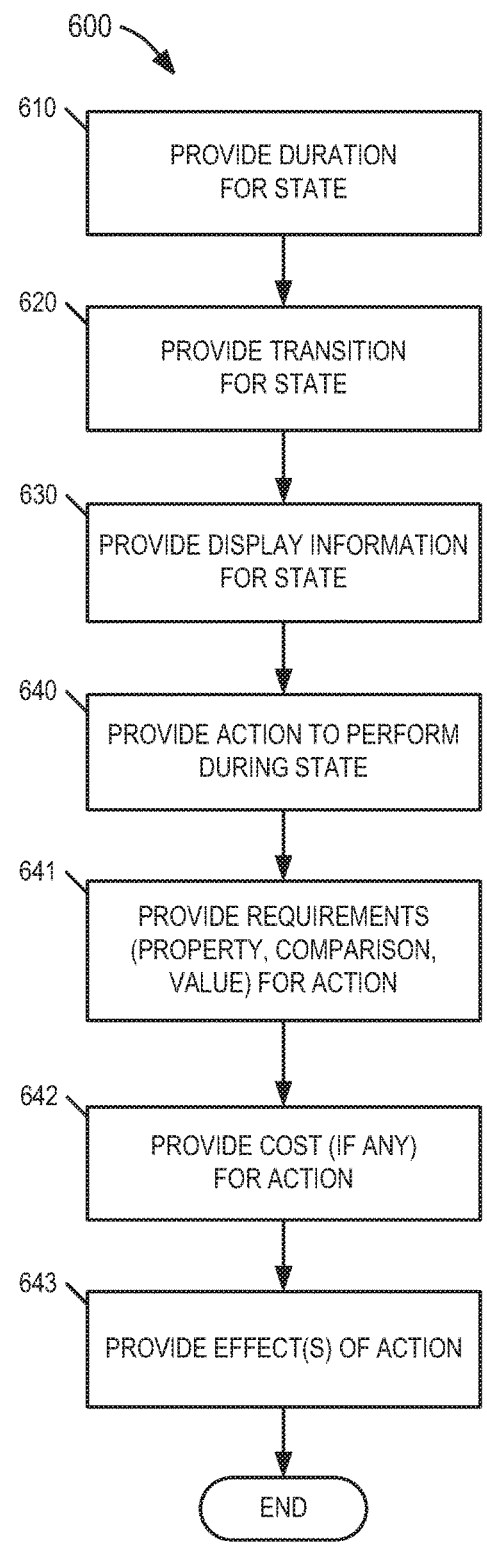
FIG. 6 illustrates an example flowchart of a method for establishing state machine definitions in connection with particular disclosed embodiments.

FIG. 6 illustrates another example embodiment of a flow chart 600 illustrating a series of operations used to establish state machine definitions in connection with a state machine.

Although the flowchart 600 only illustrates the definition of a single state within a state machine definition, it will be apparent that a state machine definition may include definitions for a plurality of states.

Establishing a definition for a state may include defining or providing the following characteristics of a state of an associated object or item, for example, in a parsable XML format file: providing a duration for a state (operation 610), indicating an amount of time that the state will operate; providing a transition for a state (operation 620), indicating which state should be transitioned to upon expiration of the state duration; providing display information for a state (operation 630), indicating visual representations associated with the state, such as visual changes for one or more virtual items, and any additional information for a display associated with the state; and providing an action to perform during the state (operation 640).

Defining or providing the characteristics of an action to perform during the state may include a number of properties for the action. These may include: providing the requirements for the action (such as a requirement property, a comparison operator, and a comparison value to compare to the requirement property) (operation 641); providing the cost for the action (in terms of in-game or external costs, such as game energy or currency) (operation 642), if any; and providing one or more effects of the action (operation 643) in the gaming environment.

Figure 7:
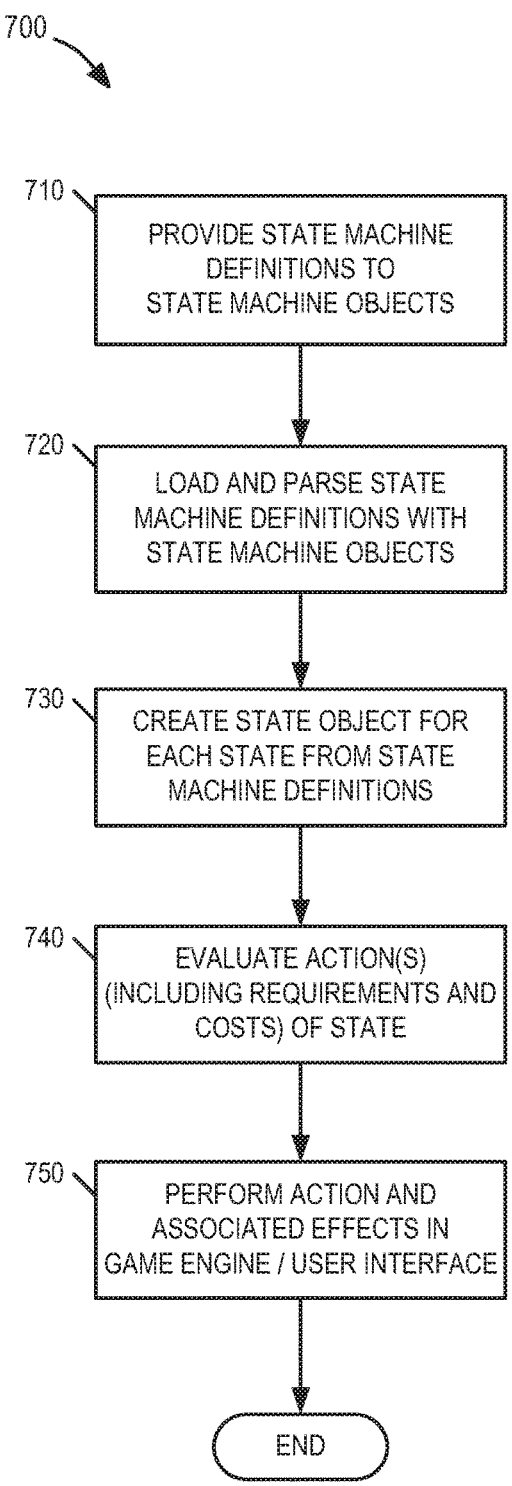
FIG. 7 illustrates an example flowchart of a method for interpreting state machine definitions and performing actions based on the state machine definitions in connection with particular disclosed embodiments.

FIG. 7 illustrates an example flowchart of a method 700 for interpreting state machine definitions and performing actions based on the state machine definitions. In the illustrated method 700, state machine definitions are provided to one or more state machine objects (operation 710). For example, this may include providing the definitions to one or both of a client-side state machine object, and a server-side state machine object.

Next, the state machine definitions (which may be in XML format) are loaded and parsed using the one or more programmatic objects of the state machine (operation 720). For example, in connection with an XML format state machine definition, the nodes may be parsed and navigated. Upon recognition of a state node or other state object representation in the state machine definition, a state object may be created within a state machine object for each state (operation 730).

Once the various state objects are created to represent each state, the state machine may perform interaction with each state within the environment. Then, when a state is entered, the state machine may evaluate available actions of the state (including action requirements and action costs) and determine whether the available actions may be executed (operation 740). Upon satisfaction of the action requirements, action costs, and other necessary prerequisites of the action, the action and its associated effects may be performed in either or both of the server-side state machine or the client-side state machine (e.g., the game engine and user interface respectively) (operation 750). Thus, the client- and server-specific state machines will proceed to implement actions in the environment during the appropriate state, as the state machine proceeds from one state to another.

The following provides additional implementation details on a system for providing a virtual gaming environment, and various architectural examples needed to implement multiplayer online virtual gaming environment. Although a number of the state machine examples herein are provided with reference to such an example virtual gaming environment, it will be apparent that a state machine may be implemented in other types of gaming environments including non-role playing games (e.g., strategy games, cooperative games), and games executing exclusively in a client-based or single computing system. Further, the state machine techniques described herein may be applied in a variety of non-game software settings, such as a software environment where a series of actions and events occur in response to user interactivity.

Data Flow

Figure 8:
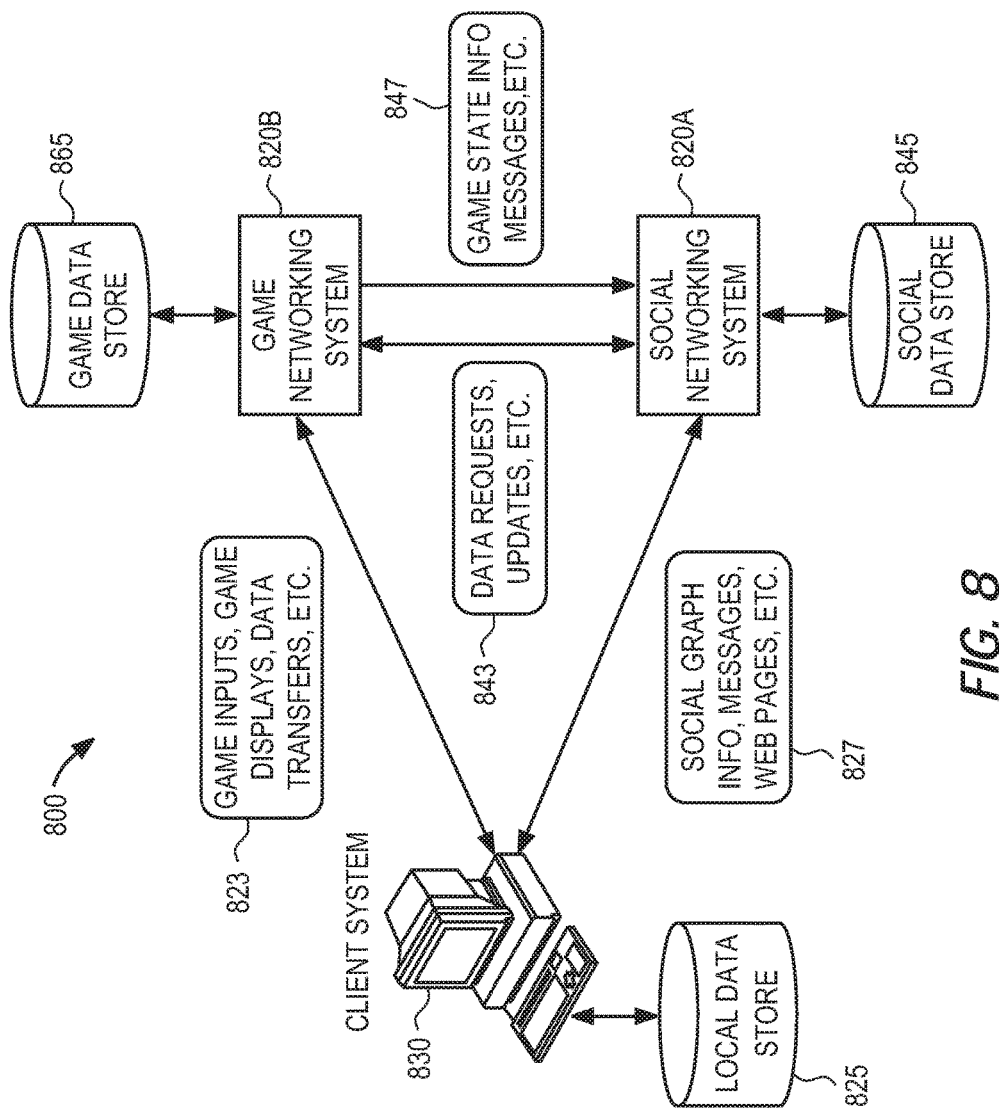
FIG. 8 illustrates an example data flow in a system.

FIG. 8 illustrates an example data flow between the components of an example system 800. In some example embodiments, system 800 can include client system 830, social networking system 820*a*, and game networking system 820*b*. A system 300 such as that described with reference to FIG. 3 may be provided by the client system 830, the social networking system 820*a*, or the game networking system 820*b*, or by any combination of these systems. The components of system 800 can be connected to each other in any suitable configuration, using any suitable type of connection. The components may be connected directly or over any suitable network. Client system 830, social networking system 820*a*, and game networking system 820*b* can each have one or more corresponding data stores such as local data store 825, social data store 845, and game data store 865, respectively. Social networking system 820*a* and game networking system 820*b* can also have one or more servers that can communicate with client system 830 over an appropriate network. Social networking system 820*a* and game networking system 820*b* can have, for example, one or more Internet servers for communicating with client system 830 via the Internet. Similarly, social networking system 820*a* and game networking system 820*b* can have one or more mobile servers for communicating with client system 830 via a mobile network (e.g., GSM, PCS, UMTS, HSPA, EVDO, LTE, LTE-A, Wi-Fi, WPAN, etc.). In some example embodiments, one server may be able to communicate with client system 830 over both the Internet and a mobile network. In other example embodiments, separate servers can be used.

Client system 830 can receive and transmit data 823 to and from game networking system 820*b*. This data can include, for example, webpages, messages, game inputs, game displays, HTTP packets, data requests, transaction information, updates, and other suitable data. At some other time, or at the same time, game networking system 820*b* can communicate data 843, 847 (e.g., game state information, game system account information, page info, messages, data requests, updates, etc.) with other networking systems, such as social networking system 820*a* (e.g., Facebook, Myspace, Google+, etc.). Client system 830 can also receive and transmit data 827 to and from social networking system 820*a*. This data can include, for example, webpages, messages, social graph information, social network displays, HTTP packets, data requests, transaction information, updates, and other suitable data.

Communication between client system 830, social networking system 820*a*, and game networking system 820*b* can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In some example embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In some example embodiments, a client request may cause a server to respond with a first data object, such as an HTML page, which itself refers to other data objects. A client application, such as a browser, will request these additional data objects as it parses or otherwise processes the first data object.

In some example embodiments, an instance of an online game can be stored as a set of game state parameters that characterize the state of various in-game objects, such as, for example, player character state parameters, non-player character parameters, and virtual item parameters. In some example embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executed object to process. In some example embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB, and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In some example embodiments, a computed-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In some example embodiments, the computer-implemented game may be implemented using Adobe FLASH-based technologies. As an example and not by way of limitation, a game may be fully or partially implemented as a SWF object that is embedded in a web page and executable by a Flash media player plug-in. In some example embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In some example embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820a or game networking system 820b), where an instance of the online game is executed remotely on a client system 830, which then transmits application event data to the hosting system such that the remote game server synchronizes the game state associated with the instance executed by the client system 830.

In some example embodiments, one or more objects of a game may be represented as an Adobe Flash object. Flash may manipulate vector and raster graphics, and supports bidirectional streaming of audio and video. "Flash" may mean the authoring environment, the player, or the application files. In some example embodiments, client system 830 may include a Flash client. The Flash client may be configured to receive and run Flash application or game object code from any suitable networking system (such as, for example, social networking system 820a or game networking system 820b). In some example embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In some example embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In some example embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In some example embodiments, each application datum may have a name and a value. The value of an application datum may change at any time in response to the game play of a player or in response to the game engine (e.g., based on the game logic). In some example embodiments, an application data update occurs when the value of a specific application datum is changed. In some example embodiments, each application event datum may include an action or event name and a value (such as an object identifier). Thus, each application datum may be represented as a name-value pair in the batch file. The batch file may include a collection of name-value pairs representing the application data that have been updated at client system 830. In some example embodiments, the batch file may be a text file and the name-value pairs may be in string format.

In some example embodiments, when a player plays an online game on client system 830, game networking system 820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In some example embodiments, while a player is not playing the online game, the corresponding BLOB may be stored in the database. This enables a player to stop playing the game at any time without losing the current state of the game the player is in. When a player resumes playing the game next time, game networking system 820*b* may retrieve the corresponding BLOB from the database to determine the most-recent values of the game-related data. In some example embodiments, while a player is playing the online game, game networking system 820*b* may also load the corresponding BLOB into a memory cache so that the game system may have faster access to the BLOB and the game-related data contained therein.

Systems and Methods

In some example embodiments, one or more described webpages may be associated with a networking system or networking service. However, alternative example embodiments may have application to the retrieval and rendering of structured documents hosted by any type of network addressable resource or web site. Additionally, as used herein, a user may be an individual, a group, or an entity (such as a business or third party application).

Figure 9:
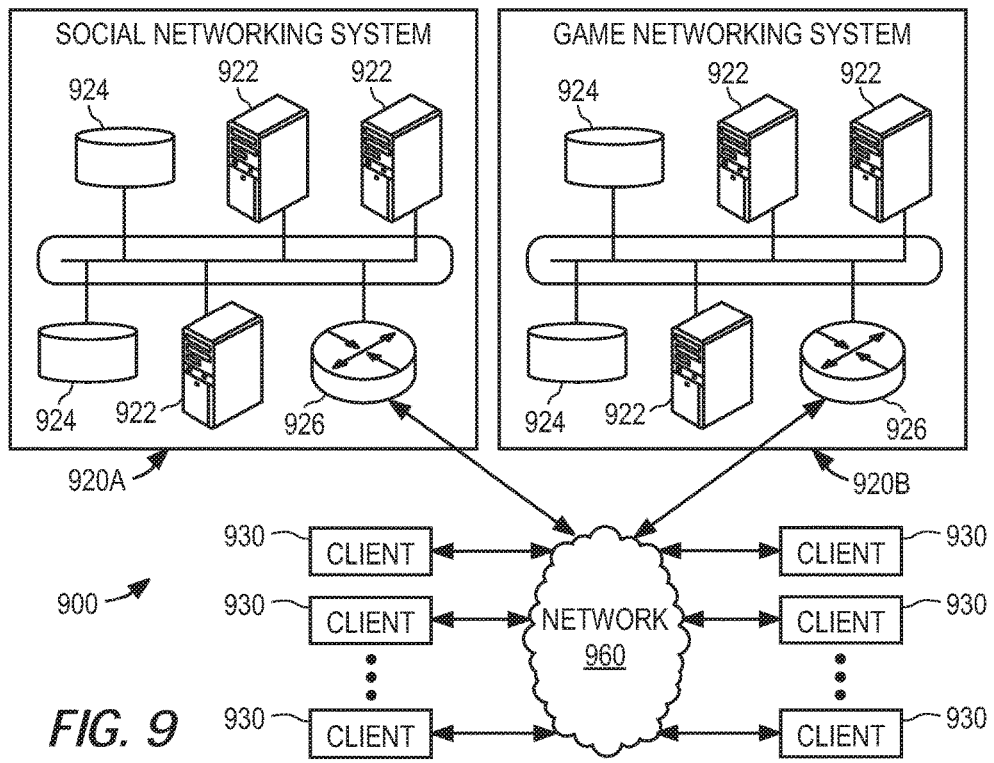
FIG. 9 illustrates an example network environment.

Some example embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein, can communicate. Network cloud 960 may include packet-based WAN (such as the Internet), private networks, wireless networks, satellite networks, cellular networks, paging networks, and the like. As FIG. 9 illustrates, some example embodiments may operate in a network environment comprising one or more networking systems, such as social networking system 920*a*, game networking system 920*b*, and one or more client systems 930. The components of social networking system 920*a* and game networking system 920*b* operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to computer network 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in some example embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In some example embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (PDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In some example embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user ID, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 is described with respect to social networking system 920*a* and game networking system 920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
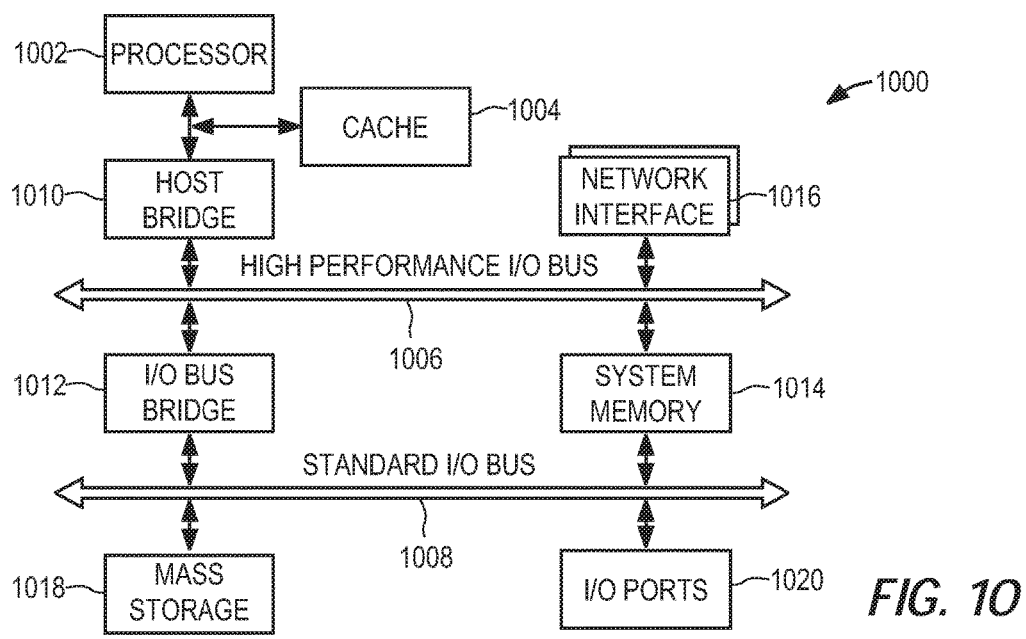
FIG. 10 illustrates an example computer system architecture.

FIG. 10 illustrates an example computing system architecture, which may be used to implement a server 922 or a client system 930. In one example embodiment, hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail herein. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 422, whereas system memory 1014 (e.g., DRAM) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006. In addition, in some example embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Modules, Components, and Logic

Certain example embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various example embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering example embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In example embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other example embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

Miscellaneous

One or more features from any embodiment may be combined with one or more features of any other embodiment without departing from the scope of the disclosure.

A recitation of "a," "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some example embodiments the term "web service" and "website" may be used interchangeably and additionally may refer to a custom or generalized API on a device, such as a mobile device (e.g., a cellular phone, smart phone, personal GPS, personal digital assistant, personal gaming device), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method of providing a data-driven interactive display of a computer-implemented game on a client computing system using a state machine, the method comprising electronic operations executed by the client computing system, the operations including:
    obtaining a state machine definition from a server computer system, wherein the state machine definition defines a plurality of states of a plurality of graphical objects in an interactive display for the game, and wherein the plurality of states control characteristics of the respective objects of the plurality of graphical objects;
    loading the state machine definition within a client-implemented state machine, wherein the client-implemented state machine controls display of the plurality of graphical objects, and wherein the state machine definition includes tokenized strings that represent variable values in respective states applicable to respective graphical objects of the plurality of graphical objects;
    in response to determination by the client-implemented state machine of a first state of a particular graphical object, generating display of the particular graphical object in the interactive display of the game;
    identifying a runtime variable of the first state from parsing a particular tokenized string with the client-implemented state machine, wherein the runtime variable is determined during runtime of the interactive display of the game to identify a first display property of the first state of the particular graphical object, and wherein the client-implemented state machine uses the first display property of the first state to implement a requirement, a cost, or an effect corresponding with the display of the particular graphical object; and
    in response to determination by the client-implemented state machine of a second state of a particular graphical object, generating an updated display of the particular graphical object in the interactive display of the game, wherein the client-implemented state machine uses a second display property of the second state to implement a requirement, a cost; or an effect corresponding with the updated display of the particular graphical object.

2. The method of claim 1, further comprising:
    receiving a user interaction with the particular graphical object in the interactive display of the game, wherein the user interaction is defined by the first state of the particular graphical object, and wherein the user interaction causes a transition to the second state of the particular graphical object.

3. The method of claim 1, further comprising:
    receiving a script from the server computing system, the script invoked by the particular tokenized string in response to parsing the particular tokenized string with the client-implemented state machine.

4. The method of claim 1, further comprising:
    initializing a client-server state machine architecture in operation with the interactive display of the game;
    wherein the client-server state machine architecture includes a server-implemented state machine operating on the server computing system and the client-implemented state machine operating on the client computing system; and
    wherein the server-implemented state machine provides the machine definition and tracks the plurality of states of the plurality of graphical objects.

5. The method of claim 4, further comprising:
    communicating state information of the first state and the second state to the server-implemented state machine.

6. The method of claim 5,
    wherein communicating state information to the server-implemented state machine includes providing a transaction object to the server computing system,
    wherein the transaction object includes information to enable the server computing system to synchronize the server-implemented state machine to the client-implemented state machine, and
    wherein the transaction object includes an identifier of the particular graphical object and an indication of the first state and the second state.

7. The method of claim 1, further comprising:
    generating state machine definitions for respective states of the plurality of states of the interactive display for the game, by:
    defining information for the plurality of states that defines transitions among the respective states, display information for the respective states, and actions available to perform during the respective states; and
    defining the actions available to perform during the respective states, the actions corresponding to requirements, costs, and effects of respective user interactions with respective graphical objects.

8. The method of claim 7, wherein loading the state machine definition includes evaluating conditions for respective actions defined in the generated state machine definitions, wherein action requirements and costs of each state are evaluated using the client-implemented state machine.

9. The method of claim 8, further comprising:
determining if action requirements and costs of the first state are satisfied; and
transitioning to the second state of the particular graphical object using the client-implemented state machine, in response to successfully determining that the action requirement and the costs of the first state are satisfied.

10. A non-transitory computer-readable storage medium comprising instructions, that when executed by one or more processors of a computing system, cause the computing system to:
obtain a state machine definition from a server computer system, wherein the state machine definition defines a plurality of states of a plurality of graphical objects in an interactive display for a computer-implemented game, and wherein the plurality of states control characteristics of the respective objects of the plurality of graphical objects;
load the state machine definition within a client-implemented state machine, wherein the client-implemented state machine controls display of the plurality of graphical objects, and wherein the state machine definition includes tokenized strings that represent variable values in respective states applicable to respective graphical objects of the plurality of graphical objects;
generate a display of a particular graphical object in the interactive display of the game, in response to a first state of the particular graphical object determined using the client-implemented state machine;
identify a runtime variable of the first state from parsing a particular tokenized string with the client-implemented state machine, wherein the runtime variable is determined during runtime of the interactive display of the game to identify a first display property of the first state of the particular graphical object, and wherein the client-implemented state machine uses the first display property of the first state to implement a requirement, a cost, or an effect corresponding with the display of the particular graphical object; and
generate an updated display of the particular graphical object in the interactive display of the game, in response to a second state of the particular graphical object determined using the client-implemented state machine; wherein the client-implemented state machine uses a second display property of the second state to implement a requirement, a cost, or an effect corresponding with the updated display of the particular graphical object.

11. The computer-readable storage medium of claim 10, the instructions further to cause the computing system to:
process a user interaction with the particular graphical object in the interactive display of the game, wherein the user interaction is defined by the first state of the particular graphical object, and wherein the user interaction causes a transition to the second state of the particular graphical object.

12. The computer-readable storage medium of claim 10, the instructions further to cause the computing system to:
process a script received from the server computing system, the script invoked by the particular tokenized string in response to parsing the particular tokenized string with the client-implemented state machine.

13. The computer-readable storage medium of claim 10, the instructions further to cause the computing system to:

initialize a client-server state machine architecture in operation with the interactive display of the game;
wherein the client-server state machine architecture includes a server-implemented state machine operating on the server computing system and the client-implemented state machine operating on the client computing system; and
wherein the server-implemented state machine provides the state machine definition and tracks the plurality of states of the plurality of graphical objects.

14. The computer-readable storage medium of claim 13, the instructions further to cause the computing system to:
communicate state information of the first state and the second state to the server-implemented state machine.

15. The computer-readable storage medium of claim 14, wherein operations to communicate state information to the server-implemented state machine includes providing a transaction object to the server computing system, wherein the transaction object includes information to enable the server computing system to synchronize the server-implemented state machine to the client-implemented state machine, and
wherein the transaction object includes an identifier of the particular graphical object and an indication of the first state and the second state.

16. The computer-readable storage medium of claim 10, the instructions further to cause the computing system to:
generate state machine definitions for respective states of the plurality of states of the interactive display for the game, by:
define information for the plurality of states that defines transitions among the respective states, display information for the respective states, and actions available to perform during the respective states; and
define the actions available to perform during the respective states, the actions corresponding to requirements, costs, and effects of respective user interactions with respective graphical objects.

17. The computer-readable storage medium of claim 16, wherein the operations to load the state machine definition include evaluation of conditions for respective actions defined in the generated state machine definitions, wherein action requirements and costs of each state are evaluated using the client-implemented state machine.

18. The computer-readable storage medium of claim 10, the instructions further to cause the computing system to:
determine if action requirements and costs of the first state are satisfied; and
transition to the second state of the particular graphical object using the client-implemented state machine, in response to successfully determining that the action requirement and the costs of the first state are satisfied.

19. A system, comprising:
one or more processors; and
one or more memory devices with instructions stored thereon, wherein the instructions are executed by the one or more processors to implement one or more modules, the one or more modules including:
a state machine client module including instructions that, when executed by the one or more processors:
obtain a state machine definition from a server computer system, wherein the state machine definition defines a plurality of states of a plurality of graphical objects in an interactive display for a computer-implemented game, and wherein the plurality of states control characteristics of the respective objects of the plurality of graphical objects;

load the state machine definition within a client-implemented state machine, wherein the client-implemented state machine controls display of the plurality of graphical objects; and wherein the state machine definition includes tokenized strings that represent variable values in respective states applicable to respective graphical objects of the plurality of graphical objects; and a user interface display module including instructions that, when executed by the one or more processors:

generate a display of a particular graphical object in the interactive display of the game, in response to a first state of the particular graphical object determined using the client-implemented state machine;

identify a runtime variable of the first state from parsing a particular tokenized string with the client-implemented state machine, wherein the runtime variable is determined during runtime of the interactive display of the game to identify a first display property of the first state of the particular graphical object, and wherein the client-implemented state machine uses the first display property of the first state to implement a requirement, a cost, or an effect corresponding with the display of the particular graphical object; and generate an updated display of the particular graphical object in the interactive display of the game, in response to a second state of the particular graphical object determined using the client-implemented state machine, wherein the client-implemented state machine uses a second display property of the second state to implement a requirement, a cost, or an effect corresponding with the updated display of the particular graphical object.

20. The system of claim 19, further comprising:

a state machine data module including instructions that, when executed by the one or more processors:

processes a user interaction with the particular graphical object in the interactive display of the game, wherein the user interaction is defined by the first state of the particular graphical object, and wherein the user interaction causes a transition to the second state of the particular graphical object, a state machine scripting module including instructions that, when executed by the one or more processors;

process a script received from the server computing system, the script invoked by the particular tokenized string in response to parsing the particular tokenized string with the client-implemented state machine.

21. The system of claim 19, further comprising:

a state machine scripting module including instructions that, when executed by the one or more processors:

process a script received from the server computing system, the script invoked by the particular tokenized string in response to parsing the particular tokenized string with the client-implemented state machine.

* * * * *

UNITED STATES PATENT AND TRADEMARK OFFICE
CERTIFICATE OF CORRECTION

PATENT NO. : 9,821,230 B2  
APPLICATION NO. : 15/091932  
DATED : November 21, 2017  
INVENTOR(S) : Chapman et al.

It is certified that error appears in the above-identified patent and that said Letters Patent is hereby corrected as shown below:

On the Title Page

On page 2, in Column 2, under "Other Publications", Line 33, delete "Brovvnlee," and insert --Brownlee,-- therefor In the Specification In Column 14, Line 62, delete "executed," and insert --executed;-- therefor In Column 24, Line 29, delete "1/O" and insert --I/O-- therefor In the Claims In Column 27, Line 60, in Claim 1, after "generating", insert --a--

In Column 28, Line 11, in Claim 1, delete "cost;" and insert --cost,-- therefor

In Column 28, Line 37, in Claim 4, after "the", insert --state-- (First Occurrence)

In Column 29, Line 47, in Claim 10, delete "machine;" and insert --machine,-- therefor In Column 32, Line 16, in Claim 20, delete "processors;" and insert --processors:-- therefor Signed and Sealed this  
Eleventh Day of June, 2019

Andrei Iancu  
*Director of the United States Patent and Trademark Office*